(12) United States Patent
Mankoff

(10) Patent No.: US 8,825,522 B2
(45) Date of Patent: Sep. 2, 2014

(54) DELIVERY, ORGANIZATION, AND REDEMPTION OF VIRTUAL OFFERS FROM THE INTERNET, INTERACTIVE-TV, WIRELESS DEVICES AND OTHER ELECTRONIC MEANS

(76) Inventor: Jeffrey W. Mankoff, Dallas, TX (US)

(*) Notice: Subject to any disclaimer, the term of this patent is extended or adjusted under 35 U.S.C. 154(b) by 13 days.

(21) Appl. No.: 13/584,632

(22) Filed: Aug. 13, 2012

(65) Prior Publication Data
US 2012/0310721 A1 Dec. 6, 2012

Related U.S. Application Data

(60) Continuation of application No. 13/226,210, filed on Sep. 6, 2011, now Pat. No. 8,244,580, which is a continuation of application No. 11/381,507, filed on May 3, 2006, now Pat. No. 8,036,934, which is a division of application No. 10/262,767, filed on Oct. 1, 2002, now Pat. No. 7,593,862, which is a continuation-in-part of application No. 10/081,257, filed on Feb. 22, 2002, now abandoned, which is a continuation-in-part of application No. 09/611,672, filed on Jul. 7, 2000, now Pat. No. 6,868,426.

(60) Provisional application No. 60/142,611, filed on Jul. 7, 1999, provisional application No. 60/191,352, filed on Mar. 22, 2000.

(51) Int. Cl.
*G06Q 30/02* (2012.01)

(52) U.S. Cl.
USPC .................. 705/14.17; 705/14.23; 705/14.64

(58) Field of Classification Search
CPC .......... G06Q 30/0207; G06Q 30/0215; G06Q 30/0222; G06Q 30/0267
USPC ........................ 705/14.1, 14.17, 14.23, 14.64
See application file for complete search history.

(56) References Cited

U.S. PATENT DOCUMENTS

| | | | |
|---|---|---|---|
| 4,010,964 A | 3/1977 | Schechter | |
| 4,097,067 A | 6/1978 | Schechter | |

(Continued)

FOREIGN PATENT DOCUMENTS

| | | |
|---|---|---|
| CN | 1357129 | 7/2002 |
| JP | 7327094 | 12/1995 |

(Continued)

OTHER PUBLICATIONS

U.S. Appl. No. 09/309,989, filed May 11, 1999, Mankoff.

(Continued)

*Primary Examiner* — Donald L Champagne
(74) *Attorney, Agent, or Firm* — James H. Ortega; Carstens & Cahoon, LLP

(57) ABSTRACT

Disclosed are methods and systems for redeeming virtual coupons by associating the coupons with a consumer and a payment system associated with the consumer. In some embodiments, the method includes distributing the enabled promotional offers, from one or more source sites, via the electronic contact addresses for the plurality of consumers, such that the promotional offers can be electronically accepted by at least some of the particular consumers with whom they are identified without redeeming the accepted offers. The method further includes electronically receiving a redemption of the promotional offer by means of the consumer's presentment of the associated payment system for purchasing the subject matter of the accepted promotional offer.

18 Claims, 9 Drawing Sheets

(56) References Cited

U.S. PATENT DOCUMENTS

| | | | |
|---|---|---|---|
| 4,882,675 | A | 11/1989 | Nichtberger et al. |
| 5,025,372 | A | 6/1991 | Burton |
| 5,249,044 | A | 9/1993 | Von Kohorn |
| 5,305,197 | A | 4/1994 | Axler et al. |
| RE34,915 | E | 4/1995 | Nichtberger et al. |
| 5,420,606 | A * | 5/1995 | Begum et al. ............... 345/156 |
| 5,528,490 | A | 6/1996 | Hill |
| 5,585,866 | A | 12/1996 | Miller et al. |
| 5,734,823 | A | 3/1998 | Saigh et al. |
| 5,761,649 | A | 6/1998 | Hill |
| 5,773,954 | A | 6/1998 | VanHorn |
| 5,806,044 | A | 9/1998 | Powell |
| 5,821,513 | A | 10/1998 | O'Hagan et al. |
| 5,855,007 | A | 12/1998 | Jovicic et al. |
| 5,867,208 | A | 2/1999 | McLaren |
| 5,948,061 | A | 9/1999 | Merriman et al. |
| 5,970,469 | A | 10/1999 | Scroggie et al. |
| 5,992,888 | A | 11/1999 | North et al. |
| 5,999,914 | A | 12/1999 | Blinn et al. |
| 6,009,410 | A | 12/1999 | LeMole et al. |
| 6,009,411 | A | 12/1999 | Kepecs |
| 6,014,634 | A | 1/2000 | Scroggie et al. |
| 6,026,369 | A | 2/2000 | Capek |
| 6,029,142 | A | 2/2000 | Hill |
| 6,041,309 | A | 3/2000 | Laor |
| 6,049,779 | A | 4/2000 | Berkson |
| 6,092,090 | A | 7/2000 | Payne et al. |
| 6,101,485 | A | 8/2000 | Fortenberry et al. |
| 6,102,406 | A | 8/2000 | Miles et al. |
| 6,108,640 | A | 8/2000 | Slotznick |
| 6,256,614 | B1 | 7/2001 | Wecker et al. |
| 6,292,785 | B1 | 9/2001 | McEvoy et al. |
| 6,321,208 | B1 | 11/2001 | Barnett et al. |
| 6,324,526 | B1 | 11/2001 | D'Agostino |
| 6,326,982 | B1 | 12/2001 | Wu et al. |
| 6,330,543 | B1 | 12/2001 | Kepecs |
| 6,332,124 | B1 | 12/2001 | Loeb et al. |
| 6,336,098 | B1 | 1/2002 | Fortenberry et al. |
| 6,356,905 | B1 | 3/2002 | Gershman et al. |
| 6,370,513 | B1 | 4/2002 | Kolawa et al. |
| 6,385,591 | B1 | 5/2002 | Mankoff |
| 6,424,950 | B1 | 7/2002 | Weller |
| 6,450,407 | B1 | 9/2002 | Freeman |
| 6,584,448 | B1 | 6/2003 | Laor |
| 6,915,271 | B1 | 7/2005 | Meyer et al. |
| 6,968,180 | B2 * | 11/2005 | Kirby et al. ............... 455/414.1 |
| 7,216,083 | B2 * | 5/2007 | Parmelee et al. ............... 705/64 |
| 8,140,386 | B2 * | 3/2012 | Mankoff ............... 705/14.17 |
| 2001/0042010 | A1 * | 11/2001 | Hassell ............... 705/14 |
| 2002/0010623 | A1 | 1/2002 | McCollom et al. |
| 2002/0035536 | A1 | 3/2002 | Gellman |
| 2002/0062249 | A1 | 5/2002 | Iannacci |
| 2002/0111863 | A1 | 8/2002 | Landesmann |
| 2002/0120627 | A1 | 8/2002 | Mankoff |
| 2002/0194069 | A1 * | 12/2002 | Thakur et al. ............... 705/14 |
| 2003/0028518 | A1 | 2/2003 | Mankoff |
| 2012/0310721 | A1 * | 12/2012 | Mankoff ............... 705/14.26 |

FOREIGN PATENT DOCUMENTS

| | | |
|---|---|---|
| WO | WO9926176 | 5/1999 |
| WO | WO0079461 | 12/2000 |
| WO | WO0101313 | 1/2001 |
| WO | WO0186552 | 11/2001 |

OTHER PUBLICATIONS vCard: The Electronic Business Card, www.imc.org, Jan. 1, 1997, pp. 1-5, Version 2.1, Internet Mail Consortium.

vCalendar: The Personal Calendaring and Scheduling Exchange Format, www.imc.org, Jan. 1, 1997, pp. 1-5, Version 1.0, Internet Mail Consortium.

The Dynamic Duo Strikes!, Successful Franchising, Feb. 1997, pp. 1-5.

Precker, Michael, Click & Save, The Dallas Morning News, Nov. 2, 1998, pp. 1-2, Section C, Belo Interactive, Dallas.

Anders, George, Hight Tech Rivals are Battling to Make Their Web Sites "Sticky", The Wall Street Journal Interactive Edition, Feb. 11, 1999, pp. 1-3, Tech Center, Dow Jones & Company.

Weaver, Jane, AOL says, "You've got coupons", CNBC & The Wall Street Journal Business, www.msnbc.com, Feb. 14, 1999, pp. 1-4, Microsoft Corporation.

Diederich, Tom, The Web-coupon craze continues, www.cnn.com, Feb. 19, 1999, pp. 1-3, Cable News Network LP, LLP. An AOL Time Warner Company.

Albertson, Joshua, smartmoney.com: Sticky-Fingered Web Sites, Dow Jones Newswires, Mar. 4, 1999, pp. 1-3, Dow Jones & Company.

Mossberg, Walter, Don't Look on the Web for Good Calendar, The Wall Street Journal Interactive, Edition, Mar. 4, 1999, pp. 1-3, Personal Technology, Dow Jones & Company.

What is Wink: Examples, www.wink.com, Aug. 30, 2002, pp. 1-2, Liberty Broadband Interactive Television Company.

"Rebate Card": article entitled "Gee what a month!" from Sep. 1992 issue of CardTrak, downloaded Dec. 22, 2005 from http://www.cardweb.com/cardtrak/pastissues/ct_sep92.html.

"What does spam advertise?", Communications of the ACM, v. 41 n. 8, Aug. 1998, p. 80.

EP Application No. 03750269.7, Communication dated Sep. 10, 2007.

* cited by examiner

FIG. 3

*Sale at an XYZ Store Near You*

File Edit View Tools Message Help

From: xyz.com
Date: Thursday, April 04, 2002 5:04 PM
To: John Consumer
Subject: Sale at an XYZ Store Near You

SALE 20%
xyz.com XYZ

NOW IN XYZ STORES AND ONLINE ▶find a sto

206 — Click here to add this offer to your credit ca
...shop there to get your disc Click here to change how often you receive emails from us or to hear about o Welcome to Your Coupon Database — 200

Your Coupon Database

Your first coupon is being saved to your credit card. To access your Coupons in your Coupon Database, please provide this info E-mail Address
JohnConsumer@ISP.COM — 312

First Name 314    Zip 316 password 318

Send me Money-Saving Offers from our partners.

☐ yes  ☐ no — 320

SUBMIT TO START SAVING! — 322 review our privacy policy

310

DELIVERY, ORGANIZATION, AND REDEMPTION OF VIRTUAL OFFERS FROM THE INTERNET, INTERACTIVE-TV, WIRELESS DEVICES AND OTHER ELECTRONIC MEANS

RELATED APPLICATIONS

This application claims priority to and is a continuation application of U.S. patent application Ser. No. 13/226,210 filed on Sep. 6, 2011, now U.S. Pat. No. 8,244,580, which is a continuation of U.S. patent application Ser. No. 11/381,507 which has a filing date of May 3, 2006, now U.S. Pat. No. 8,036,934, which is a divisional application of U.S. patent application Ser. No. 10/262,767, which has a filing date of Oct. 1, 2002, now U.S. Pat. No. 7,593,862, which is a continuation-in-part application of U.S. patent application Ser. No. 10/081,257, which has a filing date of Feb. 22, 2002, now abandoned and application Ser. No. 09/611,672, which has a filing date of Jul. 7, 2000, now U.S. Pat. No. 6,868,426, both of which claim priority to the following provisional patent applications: 60/142,611, filed Jul. 7, 1999, and 60/191,352, filed Mar. 22, 2000. The above applications—Ser. Nos. 13/226,210, 11/381,507, 10/262,767, 10/081,257, 09/611,672, 60/142,611, and 60/191,352—are hereby incorporated by reference into this application. This application is further related to commonly owned U.S. patent application Ser. No. 09/309,989, which has a filing date of May 11, 1999, which is also hereby incorporated by reference herein.

TECHNICAL BACKGROUND

Coupons are an effective way direct marketers use to drive customers to their stores. Coupons can be for a specific store or for a specific item. Challenges for the use of coupons can be broken into three areas: 1) delivery, 2) organization, and 3) redemption.

Paper coupons are a traditional method of attracting new consumers. These paper coupons have traditionally been delivered to consumers through printed media and through direct mail marketing. Delivery of printed paper coupons is expensive for the marketer, and it is also difficult for the marketer to narrowly target the paper coupons to those most likely to use them, given the typical breadth of traditional printed media and direct mail lists. In addition to incurring the cost of printing and delivering the offer, the marketer incurs the cost of training personnel to accept the offer at the Point of Sale ("POS"), the time it takes the personnel to input the coupon at the POS, the cost to store the paper offer and the cost to audit the offer. In addition, there is a fraud cost associated with the use of paper coupons.

Once the coupon is delivered to the consumer, the consumer then clips or selects the paper coupons. As far as the consumer is concerned, organizing paper coupons is difficult and time-consuming. Consumers often place their paper coupons in a kitchen drawer or other unorganized receptacle. The coupons oftentimes are unredeemed in the drawer, and ultimately expire, unused. The consumers often fail to redeem the coupons because it is difficult for them to find needed coupons or even remember that they have coupons that can be applied to their purchases. Further, consumers may forget to take their coupons with them to the store or may not have the coupons with them for other reasons. In sum, the paper coupons are difficult for the consumer to clip, organize, and to redeem at the POS.

On-line marketing is increasingly common, as on-line marketers are readily able to rent lists from list owners and send, through mass e-mailings, e-mail offers to the thousands of consumers on the list owner's list. Paperless coupons delivered through these methods and systems can be redeemed at on-line merchants without the necessity of printing those coupons, such as by delivering a coupon code electronically and having the consumer manually input the code at the online payment page. For brick-and-mortar merchants, however, the consumer is still left with the classic problem of having to create and use paper coupons, such as by printing out the electronically delivered coupon offers. Thus, consumers are again confronted with the organizational and redemption associated with paper coupons. Further to the above approaches, although marketers have avoided the costs of printing and delivery of the offers, the marketers still face significant costs associated with fraud and fraud detection, auditing of the paper coupons, and with training of personnel at the POS.

BRIEF SUMMARY

Parent applications to this application have described novel ways to deliver, organize, and redeem paperless coupons or other promotional offers. The present application continues to build on those prior applications, from which priority has been claimed herein and which have been incorporated by reference herein. For example, provisional patent application U.S. Application No. 60/142,611, filed Jul. 7, 1999, disclosed, among other things, the associating of accepted coupon offers with credit cards along with embodiments describing how paperless or virtual coupons could be delivered to the consumers and redeemed by the consumers, including by the use of consumers' credit cards to make qualified product or service purchases. U.S. Application No. 60/191,352, filed Mar. 22, 2000, described, among other things, methods and systems for automatically organizing paperless coupons and other virtual documents, as does U.S. application Ser. No. 09/611,672, filed Jul. 7, 2000, which claims priority from the Jul. 7, 1999 and Mar. 22, 2000 applications.

Principles disclosed in the foregoing applications include web-based organization systems and methods for virtual documents. Such systems and methods provide organizing retail collateral data for consumers while creating new direct marketing opportunities for manufacturers and retailers. Today, consumers organize on their computers only a limited amount of information that they need to view (i.e., telephone numbers, address information and "to do" lists). There is more information that needs to be organized. A quick look at a typical "miscellaneous" kitchen drawer reveals coupons, receipts, rebates, gift certificates, warranties, un-mailed registration cards, instructions, tickets, credit card and bank statements, and recipes ("retail collateral"). That information should be organized online alongside and integrated with consumers' personal information, so that commercial and product brand information is readily available.

The world is fast becoming paperless. Airlines issue paperless tickets and bank statements are transmitted electronically. Virtual coupons and discounts can be found on smart cards and credit cards and are also delivered via e-mail. E-mail itself represents an organizational challenge for the consumer. Commercial e-mails end up lost on the consumer's e-mail management application with the clutter of hundreds of other e-mails. With all these paperless documents, several issues and questions arise. How will the business traveler know what flight he is on if he is issued an e-ticket? How will a consumer know he has a paperless coupon to redeem if there is no paper reminder? Where will those monthly virtual statements be accessed? How should we organize all these paperless documents?

Some of the disclosed principles intend to transform the manufacturers retail collateral into a marketing opportunity, by developing a system that will organize and integrate virtual documents with a web calendar system. The system will be a web-based, e-mail/banner ad filtration system. The web-based personal information manager (PIM) is the perfect place to organize these virtual documents because that is where the consumer already organizes his personal data. In addition, the web-based PIM has the capability to synchronize with handheld devices such as PDAs and cell phones. Using such principles, the consumer will be able to reference in one place his contacts and calendar as well as receipts, instructions, bank and credit card statements and anything else the consumer might want to organize. Also, such principles will be able to reach critical mass immediately and avoid significant marketing costs.

Thus, such a system can marry web personal information management systems with commercial e-mail communications. Today, consumers are e-mailed coupons and rebates. Tomorrow, consumers will be e-mailed bank statements and receipts. E-mail organization systems can only organize within the e-mail application and are not set up to organize the mass of virtual documents which will be e-mailed in the future. The logical place to organize and integrate this mass of commercial virtual documents is the web-based PIM where he already organizes his contact and calendar data. Thus, these principles provides the ability to consolidate, organize and integrate virtual documents delivered via e-mail and banner ads into the consumer's personal information management system.

Coupons are a perfect fit for such a system as demonstrated by the following example: Domino's Pizza® wants to e-mail a coupon to a consumer, Joe. Using current technologies, Domino's sends the coupon with a coupon ID number to Joe. Joe might not be hungry, so he reads his next e-mail and the coupon is quickly forgotten. When Joe is ready for pizza, Joe probably does not want to sort through hundreds of e-mails to find the coupon.

In order to remedy this problem, this web organizer technology translates that e-mail containing a coupon and automatically organizes the "Voupon™" (virtual coupon) into Joe's Voupon web organizer because of the proprietary code embedded as part of the e-mail address. Without Joe taking any steps to create the filter, this e-mail is automatically organized and deposited in Joe's Voupon web organizer, right below his personal contacts drawer in his web organizer Because the Voupon is part of a web organizer, the contact data from the Voupon can be integrated with Joe's contact and calendar data if he so chooses. It makes sense for Joe to have Domino's telephone number in his database, so he clicks the button that adds the telephone number and Voupon expiration date to his web contact and calendar. Later, he synchronizes his PDA, and the Domino's telephone number and expiration date is now in his PDA. The Domino's Voupon is also in the PDA's Voupon web organizer application, providing Joe another location, or impression to find his Domino's Voupon.

This e-mail filtration system also works with banner ads. The Domino's Voupon could also be in a web organizer enabled banner ad. The consumer would see the Voupon for 50% off, click it, and the Voupon would automatically be organized into Joe's Voupon area of his web organizer, with all of the same integration capabilities. In addition, virtual coupons could be selected and organized from within the web organizer, similar to existing Internet coupon companies.

The disclosed web organizer also has potential for streamlining the product registration process and providing the consumer with a system to consolidate online instructions and warranties for the products that he has registered. The product manufacturer has a great need to keep track of their customers and their purchasing needs. In order to build a better product, it needs to know who is purchasing their product. One very important tool used by manufacturers to accomplish this goal is product registration. Product registration provides invaluable customer demographics. Being at the focal point between manufacturer and consumer, the web organizer has an excellent opportunity to mine consumers' product and registration data and sell it to our affiliated manufacturers and retailers.

The web organizer also may make the registration process simple and streamlined for web organizer consumers. The consumer will be able to complete one uniform registration system and use it to register every product purchased at hundreds of web organizer-affiliated manufacturer web sites. Once the consumer registers online, the manufacturer would use the web organizer system to e-mail to the consumer verification of registration, plus virtual instruction and warranty information. The web organizer system would then automatically organize the instructions and warranty into the appropriate area of the web organizer. Later, when he needs to reference the instructions, he opens his web organizer, clicks through his instructions folder to locate the manufacturer. Once inside that folder, the consumer will see the list of products purchased. He can then click on the appropriate product and the instructions will appear by hyperlink. Customer service telephone numbers, e-mail addresses and links can be integrated into the customer's web organizer, making warranty claims easier for the consumer and the manufacturer. The manufacturer's brand is now a part of the consumer's personal information.

Transferring instructions to PDAs is a compelling use of the device as well. Since E-book technology is fast becoming a reality, it makes sense to transition that existing technology to instruction manuals. The disclosed web organizer would provide that capability. The web organizer provides an opportunity to organize and consolidate the consumer's personal instructions and warranties. The consumer does not want to have to go to Sony® to find his product's instructions, and then to GE® to find his refrigerator warranty. He wants it all in one place like his old handy file cabinet. The disclosed web organizer will provide this service. Because of this voluntary registration process, the web organizer now has valuable demographic data to further assist its affiliate manufacturers and retailers' direct marketing campaigns.

Rebates represent another product opportunity for such a web organizer. Usually, rebates are provided as an incentive to register a recently purchased product. The benefit of rebates over paperless coupons is the fact that they are redeemed after purchase, thus making rebates much more manageable from a redemption perspective. Rebates could be offered and distributed from e-mail, banner ads and the manufacturer website. Like Voupons, there would be a rebate area of the web organizer to store these virtual rebates. From the rebate area of the web organizer, the consumer could click the rebate to redeem it automatically. The consumer could then elect to redeem the rebate by check or over the Internet with an online money vendor. The web organizer could even include revenue sharing potential with online money vendors such as PayPal.com.

Digital receipts are another opportunity, and which may be e-mailed to the consumer. Again, it makes no sense for these digital receipts to be e-mailed and "lost in e-mail space".

Rather, the consumer would register so that the digital receipts are e-mailed to the consumer's web organizer. When the web organizer receives the receipts, it automatically filters and deposits them in the consumer's receipt area of the web organizer Again, there would be a special code on the e-mail to permit the web organizer to automatically recognize it as a receipt and deposit it in the receipt folder. In the receipt folder, the user receives the name of the store from which the product was purchased, along with the date. If he wants to delve deeper, he can click this link and be taken to the retailers' receipt site to view the receipt details. The retailer then has additional opportunities to engage the consumer.

Another example is bank statements. The consumer could elect to receive his bank statements via e-mail. Presently he can do this with a variety of financial institutions. The bank statements would be forwarded to joe@ecal.com, the system would recognize the bank statement, and deposit it in the web organizer alongside the consumer's contact, calendar, instructions, receipts, rebates, etc. Another example is bill statements. Not only should that bill be filed in the user's web organizer quickly and appropriately for future reference but also the bill's due date could be integrated into the consumer's calendar. Again, with the web organizer, consumers will have that opportunity.

E-Tickets are yet another opportunity. Airlines and consumers alike have quickly embraced moving from paper documents to digital documents in the arena of ticketing. According to CNN/fn, 76% of business travelers prefer electronic tickets to paper tickets. The question remains, how do travelers and other electronic ticket holders store their ticketing information? A web organizer as disclosed herein will provide an "itinerary drawer" as a component of its complete organization suite, which provides detailed itinerary information. In addition, itinerary data such as airline, flight number, scheduled departure and arrival time, hotel, and rental car data can be integrated into the web organizer contact and calendar database for later synchronization with a PDA.

One of the many features makes the disclosed web organizer stand out is its ability to synchronize all of the web organizer data with handheld devices by utilizing the web organizer's existing synchronization capabilities. The web organizer acts as a gateway for the synchronization of the data down to the handheld. Now the consumer can have his list of coupons with him in his web organizer handheld application. This web organizer handheld application will mirror the web application of the web organizer, so that there will be an area for Voupons, rebates, e-tickets, itinerary, instructions, receipts, recipes etc. In order to avoid memory problems, most of the data in each area of the web organizer could be a URL connection, and will be accessible via the PDA wireless Internet capabilities. For instance, if a consumer wants to access instructions to change the tire on his bicycle, he would access his PDA web organizer application, open the instructions area of the web organizer, and then click on the bicycle instructions, which would link him wirelessly to the instructions.

The foregoing applications, and also U.S. patent application Ser. No. 10/081,257, further describe different delivery and organization methods, including the delivery of paperless coupon offers to PDAs, wireless PDAs and interactive television.

The embodiments described in this application merge electronic delivery of on-line or virtual coupon offers with consumers' payment systems. Payment systems include credit cards, debit cards, electronic payment accounts, consumer billing systems, cell-phone-based electronic payment systems, and PDA-based electronic coupon systems. Further applications for the promotional offers can be for reward-type incentives, such as frequent flyer miles or other "points" or "credits" that may be redeemable for reward goods and/or services.

The merger of these approaches result in the electronic delivery of virtual, paperless coupons or promotional offers. Paperless redemption at the point of sale or on the consumers' payment systems statements are also enabled by embodiments disclosed in this application. To use the described approaches, consumers would associate, as an example, a credit card with a coupon database, such that coupons stored in the coupon database can automatically be redeemed by the consumer when making qualifying purchases. In some embodiments, the consumer also has a personal coupon website, where the consumer can "clip" and save coupons, thereby allowing the consumer to organize his or her coupons at a personal web site for organizing the coupons saved in the personal website. The above approaches allow the consumer to manage his or her coupons at the personal website, while also associating the coupon database with the consumer's payment system. The consumer, by using his or her associated payment system, is accordingly able to readily redeem accepted coupon offers stored in the coupon database.

In embodiments described in this application, systems and methods are provided for delivering a paperless coupon offer to a consumer and allowing the consumer to accept that offer without having to provide the consumer's credit card information. This approach mitigates consumers' natural reluctance to provide credit card information in response to a banner ad or email.

Embodiments described in this application accordingly provide for the delivery or communication of paperless offers through email, cell phone, satellite phone, land-based or wired phones, wireless PDAs, kiosks, interactive TV, two-way pagers, wireless networks, or other communication systems and devices. The paperless offer can be pre-associated with the consumers' payment systems (e.g., credit card, debit card, bank card, or other payment system). For example, list owners such as Yahoo!, AOL and Amazon (all marks of their respective owners) may have three important pieces of data: 1) an email address, 2) permission to offer third party offers to their consumer's email address, and 3) credit card numbers. With this information, the above embodiments can be practically implemented.

In embodiments described below, the marketer or advertiser who makes the coupon or other promotional offers to the consumers may not have access to the consumers' credit card information. "Advertiser" as used in this application includes product manufacturers, merchants, and other companies or entities desiring to make a promotional offer. One mechanism to associate the consumers with their credit cards without giving that information to the marketer or advertiser would be through card-matching agents. Such card-matching agents would typically receive lists of consumers' identifiers, such as consumers' email addresses, and their credit card information.

In such approaches, an offer may be created by a merchant or other advertiser with the help of the list owner's agent or list manager, or the advertiser's agent, the list broker. The list manager creates the offer and enables it to be organized (in some embodiments) and redeemed paperlessly. For example, the list manager may take a 10% off offer for Retailer XYZ and then pre-organize the offer as "apparel," "furniture," "grocery," "hardware," merchandise," or some other category (see FIG. 4). The list manager then gives the offer an identifier number. The list owner then delivers the limits of the offer to the matching agent. The list manager then appends the consumer's email address to the email itself. When the consumer "clicks" or accepts the enabled offer, it will cause an electronic acceptance message to be sent to the list manager, where the message comprises the email address that was associated with the offer identifier number when the offer was sent to the consumer. Upon receipt, the list manager transmits the email address and offer identifier to the matching agent, which then associates the email address with the consumer's associated credit card and adds the coupon identifier to the consumer's coupon database for later matching to a retail good or service transaction in which the consumer redeemed the promotional offer. The coupon database may be a simple database at the matching agent side or at the marketer site or at another location, or it may be an organized, consumer-manageable database such as described in FIG. 4 and in U.S. patent application Ser. No. 09/611,672. There may also be both types of databases, and the data contained in those databases can be synchronized according to system design requirements. Promotional offers or coupon offers are described herein in embodiments relating to "money-off" purchasing of goods or services. Such promotional offers or coupon offers may also encompass purchased vouchers or tickets or other items that are redeemable or otherwise have value. Still other promotional offers may relate to redeemable "reward points" or similar incentives that can be redeemed by consumers for goods or services.

In one implementation of such an embodiment, a list owner transfers a consumer identifier (e.g., an e-mail address) and the credit card number associated with the consumer to a matching agent. A promotional offer is then created for an advertiser. The offer is built into an email, which is forwarded to the consumer at the consumer's email address. The email contains embedded within it a consumer identifier, which may be the consumer's email address or encoded credit card information or other identifier. Upon receipt of the offer by a consumer, with one click of a button several things can happen: (1) the consumer identifier is forwarded via XML or other protocol to the matching agent along with the paperless coupon identifier; (2) the matching agent then takes the identifier, in this case the email address, and associates it with the credit card number that it has on file; and (3) the matching agent or other entity associates the paperless coupon offer with the consumer's credit card or other payment system.

Once the coupon offer has been accepted and associated with a consumer's credit card or other payment system, the consumer can redeem the coupon offer using his or her credit card or other payment system to purchase the product or service referred to in the coupon offer. At this point, the merchant sends data of the purchase to the card-matching agent, who would then match the credit card transaction to the appropriate consumer's coupon database in order to determine whether a discount should be applied. If the conditions of the offer are met, a discount would be applied. Notice of the discount to the consumer could be delivered either at the retail location itself at the time of purchase or via email, and notice could also be given in the consumer's credit card statement.

The above summary has outlined the embodiments described in this application, but should be used in the context of the entire specification to illustrate some of the features of these embodiments. Accordingly, other features and a fuller understanding of these embodiments may be had by referring to the entire specification. None of these embodiments are limiting of the scope of the invention, which must be determined by the claims set forth in the claims section.

BRIEF DESCRIPTION OF THE DRAWINGS

FIG. 3 is an exemplary pop-up window that could be presented to a consumer after the consumer's acceptance of a promotional offer;

Figure 1:
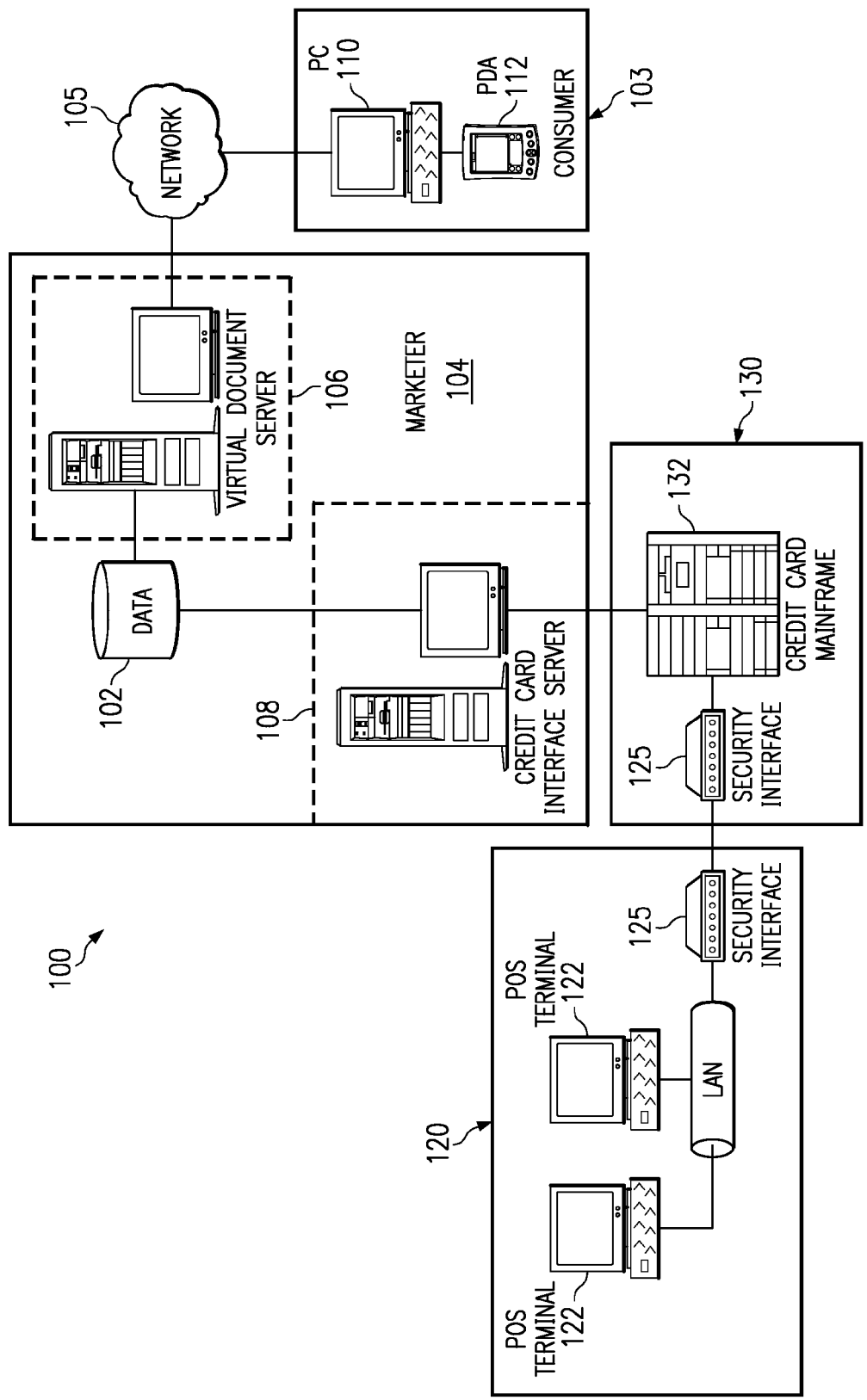
FIG. 1 is a block diagram for a promotional offer distribution, organization, and redemption system.

All of these drawings are illustrations of certain embodiments. The scope of the claims is not limited to the specific embodiments illustrated in the drawings and described below.

DETAILED DESCRIPTION OF THE EMBODIMENTS

Shown in FIG. 1 is a block diagram for a coupon offer/organization/redemption system 100 in which consumers are each provided with a coupon database 102 that can be associated with the consumers' payment system, such as credit card, debit card, electronic fund transfer account or other payment means. The consumers' virtual coupons are stored in their coupon databases 102, which would be under the control of a marketer 104, which provides, through virtual document 106, coupon offers to consumers through email, through websites on the Internet, or through other networks 105. The consumers receive, accept, and manage the coupon offers in the virtual coupon database through the consumers' personal computers 110, Personal Digital Assistants ("PDAs") 112, or other electronic devices 109 (see FIG. 10).

Within or external to the marketer site 104 is provided a credit card interface 108, which is used to link coupons stored and associated with consumers' coupon databases 102 with credit card transactions that are being cleared through the credit card mainframe 132. Through these linkages, proper credit can be applied in those instances in which consumers have redeemable coupons for products they have purchased stored in their associated coupon database 102.

Many possible coupon offer variations, as well as variation in coupon delivery mechanisms, are possible. For example, the virtual coupon offers can be delivered to the consumers 103 through mobiles phones, wireless PDAs, interactive televisions, two-way pagers or other electronic communication systems. It is further possible through the consumers' electronic communications systems to detect where the consumers 103 are located and thereby to target offers to consumers 103 based on their location. For example, when connecting through wireless connections, the particular wireless tower or access point (see FIG. 10) through which the consumer 103 is connecting to the network 105 can be detected, whereby geographic-specific offers can be made to a plurality of consumers 103. As further examples, a particular consumer's location can be detected by use of: satellite-based positioning systems; triangulation from land-based radio transmissions; detection of which transmission tower is communicating with a consumer's cell-based electronic device; and detection of a communication hub communicating with a consumer's local-area-network-based electronic device.

The direct association of paperless coupon offers with the consumers' payment systems can make the targeted offers more flexible. In a specific example, an offer can be made to a consumer 103 for a store 120 that is close to the consumer 103 based on the consumers' location. Such offers could, for example, be advantageously delivered to consumers' portable devices, such as cell phones or wireless PDAs, based on the consumers' detected locations. Rather than delivering an offer to be displayed on such portable devices for display to a merchant as a means of redemption, the present embodiments allow consumers to electronically accept the offers and have those offers be associated with the consumers' credit cards or other payment systems. As with paper coupons, this electronic acceptance and association with the consumers' payment system also mitigates against possible fraudulent attempts to redeem invalid offers, such as by displaying a contrived or unauthorized offer screen to the merchants. The described embodiments further may negate the need for the merchant to install additional equipment, such as might be used if an accepted offer were to be electronically "beamed" from the consumers' portable devices to the merchant POS terminal 102 or other equipment at the merchant POS.

Another exemplary system would be for the delivery of promotional offers to cell phones or PDAs to be made by a cell phone service provider (or other wireless communications provider) to act as the list owner. The cell phone company would then provide the list of consumer electronic contact addresses (e.g., cell phone numbers) and credit card numbers to a matching agent, which in turn would build an offer. The offer would then be delivered to the cell phones via instant messaging or some other means, and the consumers could then "click" to accept the offer or take other action (e.g. press a number key, vocalize an acceptance) to accept the offer and have it associated with the consumers' payment systems.

Because the consumer has been freed from the necessity of printing out the coupon or otherwise downloading it to a local device, the consumer 103 can simply accept the offer and thereby associate it with the consumer's credit card or other payment system. Also, because of the immediacy of storing coupon offers on the consumer's payment system, as well as the trackability of where the offer has been clicked or accepted, it is readily possible to make the offer time-adaptable. For example, the consumer 103 might be in the vicinity of Retailer XYZ 120, and the consumer accordingly might be given an offer for 25% off of purchases at that retailer made within 3 hours (or, as another example, the same day). The offer might decrease 5% in value during the next time period (e.g., between 3 hours and 12 hours or during the next day), and decrease another 5% in the next period, and so on.

When the capability of locating a consumer is coupled with the offering of time-triggered and time-sensitive offers, certain synergies emerge. For example, a consumer 103 might be "out on the town" on a Saturday night with their cell phone (see, e.g., FIG. 10). Given the time and the consumer's location, the consumer 103 might receive a real-time coupon offer on their cell phone (or PDA or similar device) for a close-by eatery or nightclub 120. The offer might be good only for the evening, or it might be worth less at a later time or date. By accepting the offer, the consumer 103 may accordingly associate the offer with their credit card, and the offer can then be readily redeemed at the local area, while the consumer is still in that area. By this approach, not only is the delivery, acceptance, and redemption of the coupon offer streamlined relative to traditional coupon delivery method, but it also more effectively targets the market for the paperless coupon offer relative to more traditional approaches.

To redeem his or her coupons, the consumers 103 visit the merchants 120—traditional or online—connected to the network as shown in FIG. 1. In this embodiment, the consumer redeems his coupons by the use of an associated credit card issued by the credit card issuer 130. The online or traditional merchant 120 would communicate with the credit card issuing bank 130 whenever the consumers' payment systems are presented to the merchants 120. At a traditional merchant, for instance, the credit cards would be run at the Point-Of-Sale ("POS") Terminal 122. The POS Terminals 122 would typically communicate through a secure connection to the credit card mainframe 132. This secure connection may be through a security interface unit 125 provided at both ends of the connection between the merchant 120 and the credit card bank 130. The connection between the retailer 120 and the credit card bank 130 could be through the Internet or through traditional point-to-point communications, such as leased or dial-up telecommunications data lines.

Although the functional block represented by the card issuer 130 is shown as a single credit card mainframe at a single site, this broad function may be more specifically implemented using at least two separate sites and/or computer systems. One site as an example would be the acquiring or merchant servicing bank site, which would interface with the merchant 120 receiving Authorization Requests and returning Approval Codes through the security interface 125. The second site in the example would be the credit card issuing bank, which would communicate with the acquiring bank computer system to gather the transaction data and communicate with the credit card interface servers 108 in order to determine when to apply appropriate discounts to the consumers' credit card statement. Both the first and the second site are functionally encompassed within the card issuer 130.

For example, the credit card approval and clearing operation may occur as follows. The consumer would bring his associated credit card to the merchant 120 after the consumer has had electronic coupons stored in his coupon database 102. The consumer would then give his card to the merchant employee, who would swipe the card through a credit card reader associated with the POS Terminal 122 as is normally done in a credit card transaction. The merchant 120 would then communicate with the credit card computer system 130 in order to seek an authorization code for the transaction from the credit card computer system. The credit card computer system 130 may then communicate with the marketer computer system 104 to determine whether the consumer is entitled to a coupon discount according to that consumer's purchases at the merchant 130. It is also possible that the credit card system 130 would gather the necessary data offline, e.g., separate from the regular credit card authorization process. The interface for this coupon clearing process may alternatively be an entirely parallel network between the merchant 120 and the credit card computer systems 130.

The consumer discount can be applied in a number of ways. One way is to transmit the discount back to the POS Terminal 122 through the security interfaces 125 as a part of the normal credit card approval process. A second way would be to apply the discount to the monthly statement of the consumer in the credit card computer system 130. And a third way would be for the coupon discounts to be accumulated and reimbursed to the consumer through the issuance of a check from either the credit card system 130 or the marketer system 104.

Figure 2:
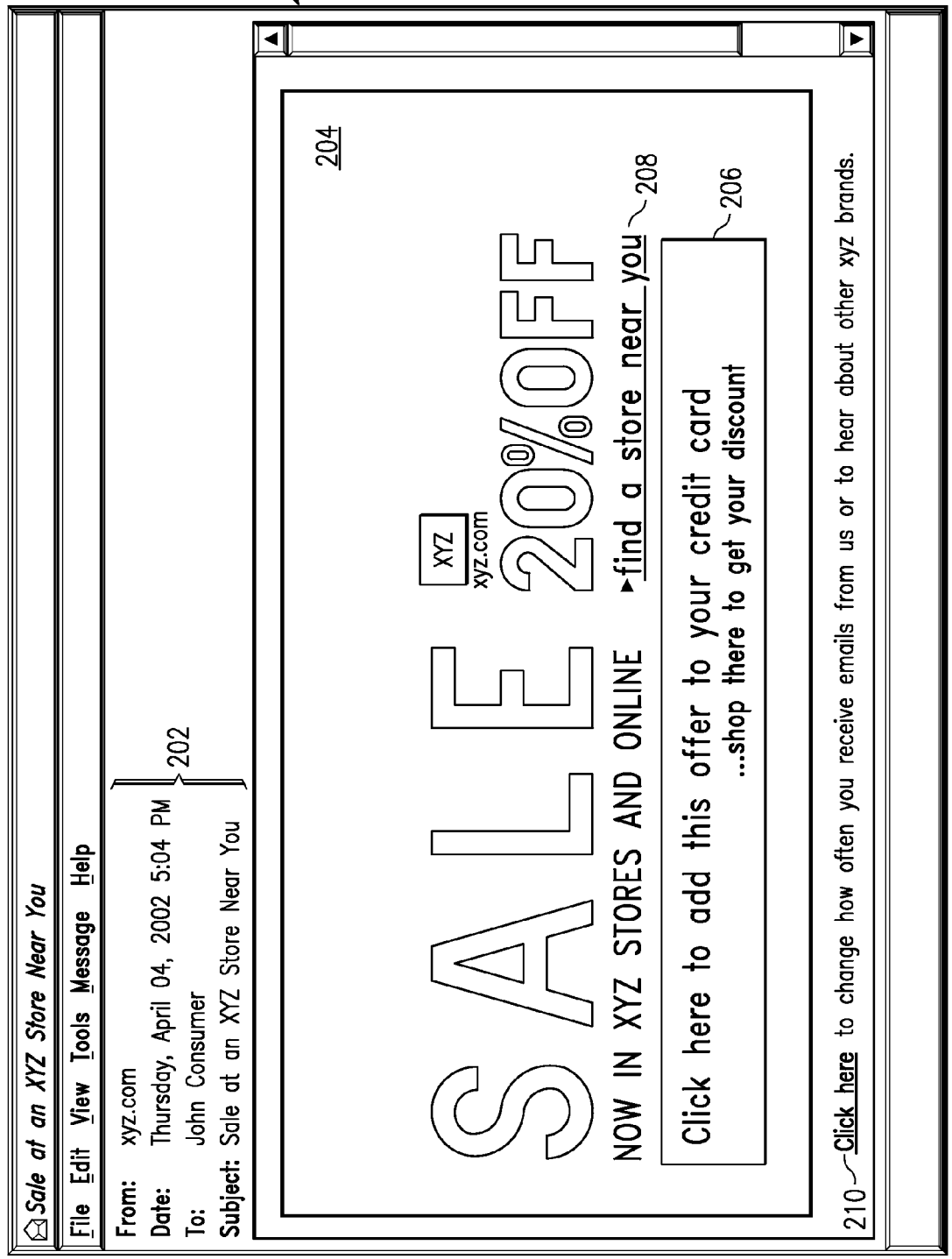
FIG. 2 provides an exemplary screenshot of an email-delivered version of a promotional offer.

There are also a number of ways by which coupon offers can be delivered to consumers. FIG. 2 provides an exemplary screen shot of what an email delivered version of a coupon offer might look like. This illustrated offer is for 20% off of purchases at Retailer XYZ. As in a normal email, there is a header section 202. This section specifies the source of the coupon offer, the date, the person for whom the offer is intended, and the subject of the coupon offer. The screen image 200 shows the entire coupon offer, including the addressing section 202 and the main message window 204. Within the main message window 204 is a clickable target 206 that allows the consumer to select this offer for storing his or her coupon organizer/credit card. The offer 200 can also provide useful information to the consumer such as the location of nearby stores through the target 208 and/or an option for changing the consumer's preferences for receiving emails from the marketer 104 via the clickable target 210.

FIG. 3 shows a pop-up window 310 that could be presented to a consumer after the consumer had clicked the target 206 to accept the coupon offer 200. In the example shown here, the consumer does not presently have a coupon database 102 associated with the consumer's credit card, because in the pop-up window 310 the offer is being described as the consumer's "first coupon." The pop-up window also provides fields for the consumer's email address 312, first name 314, zip code 316, and password 318. It also provides options for whether the consumer desires to receive other promotional offers from the marketer 104 through the indicated check boxes 320. The clickable target 322 allows the consumer to submit his or her selections to the marketer 104 so that the accepted offer can be stored in a new or existing database 102.

Figure 4:
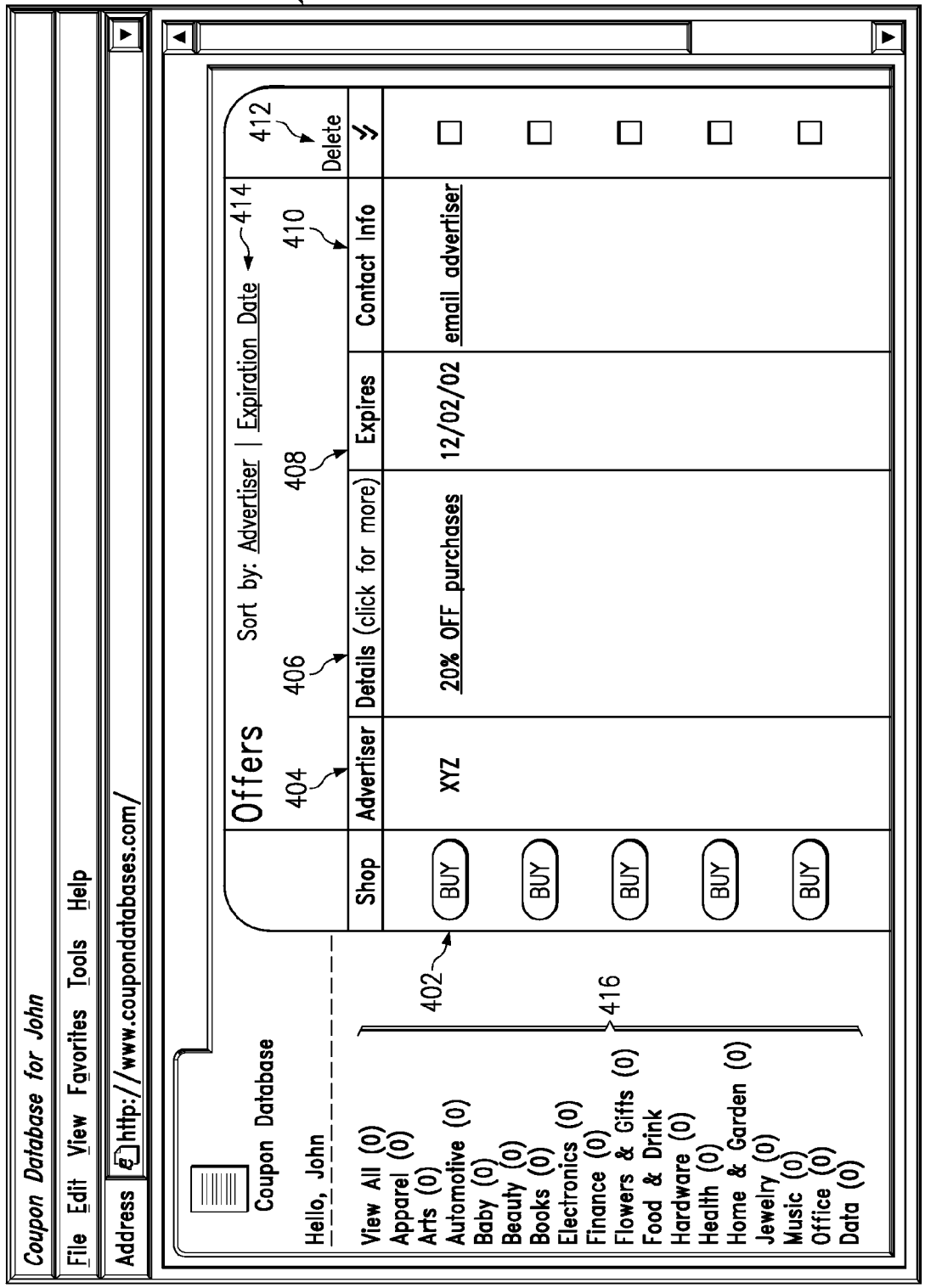
FIG. 4 is an exemplary screen shot from a graphical user interface for the coupon database organizer.

FIG. 4 shows a screen shot from a graphical user interface for the coupon database 102. Shown in this graphical display are records of the coupon offers that may be accepted by the consumer with whom the coupon database 102 is associated. The first such record 402 shows the entry for the coupon offer 200 that has been discussed above. Fields shown for this record includes the advertiser 404, a brief description of the offer 406, the expiration date 408, and merchant contact information 410. Also provided is a means to delete offers from the coupon database 102, which is provided by the "DELETE" checkbox 412. The user interface 400 also includes items to assist the consumer in navigating and organizing the contents of their coupon database. For example, clickable targets 414 are provided to allow the consumer to search, for example, by advertiser 404 or expiration date 408. Alternatively, the column headers for the columns 404 through 410 could be clickable in order to sort on those fields. Also provided are a number of coupon categories 416, which can allow the consumer to filter down the many offers into more manageable groups.

Figure 5:
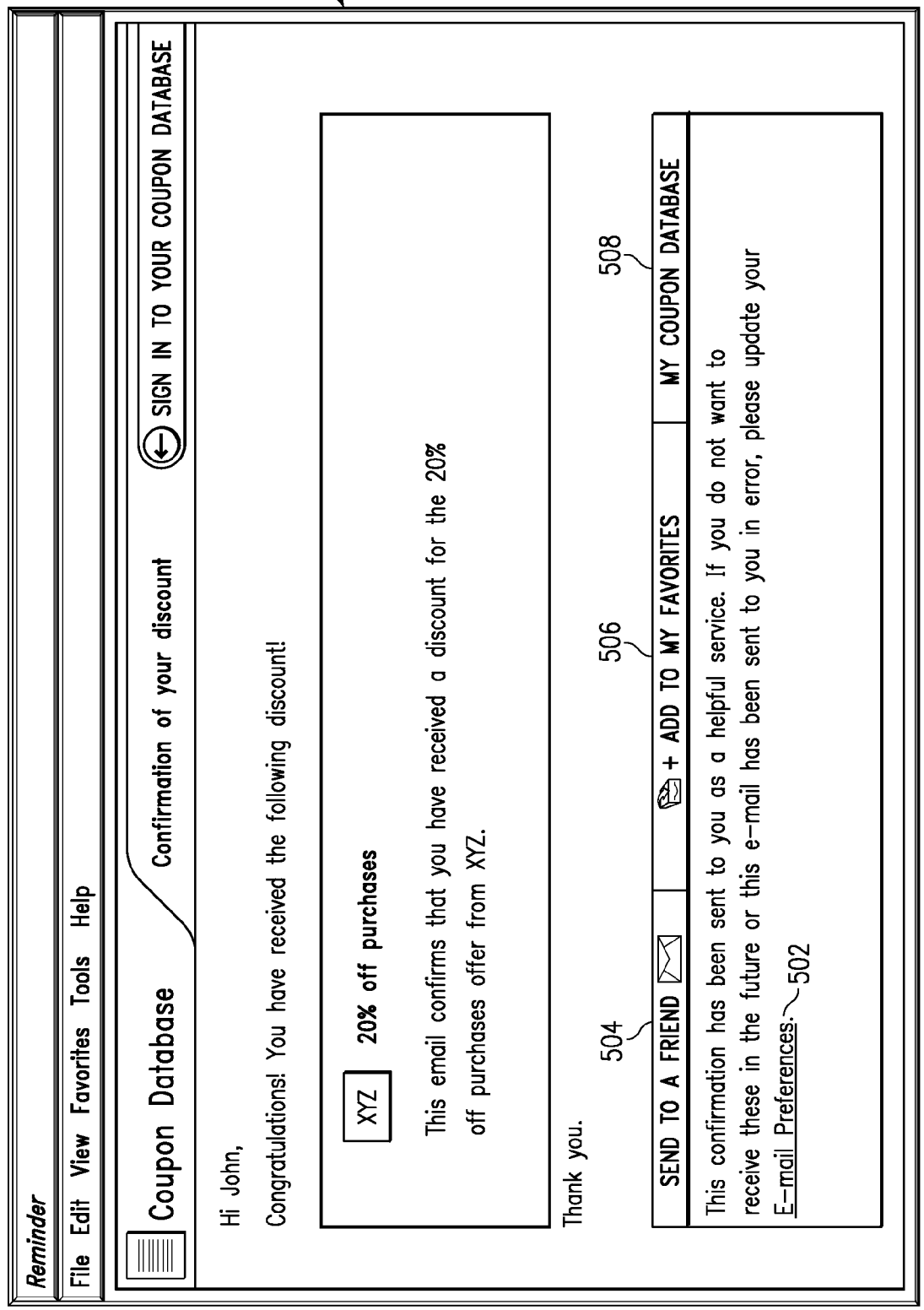
FIG. 5 illustrates a screen shot of an acknowledgement message sent upon redemption of an accepted promotional offer.

FIG. 5 illustrates a screen shot of a confirming email that may be sent to a consumer upon successful redemption of one of his coupons. This confirmation email 500 is one of a number of types of email that may be sent to a consumer according to their email preferences, which may be updated by clicking on the target 502 shown in the email 500. Also provided are targets by which a consumer can forward coupon offers to their friends through clickable target 504, add the coupon database link to their "Favorites" through the clickable target 506, or be taken directly to their coupon database through the target 508.

Figure 6:
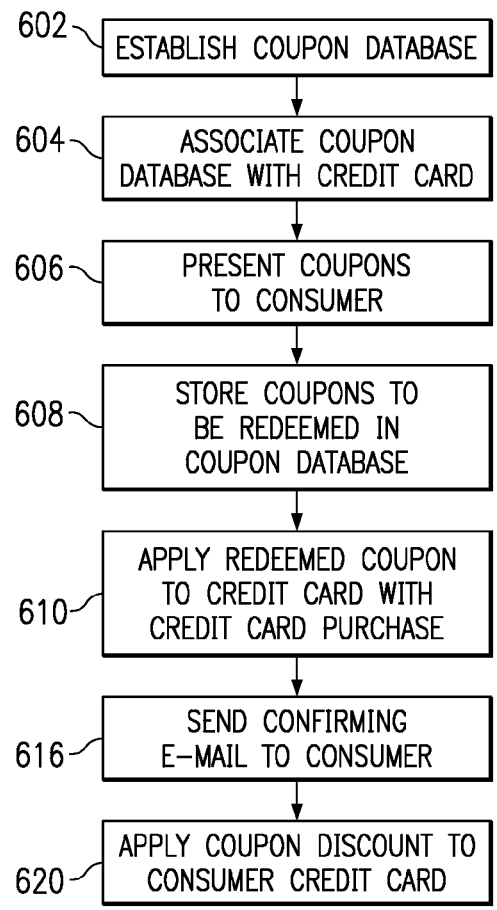
FIG. 6 is an exemplary process flow diagram for the collection and redemption of promotional offers.

FIG. 6 is a process flow diagram for the collection and redemption of virtual coupons by consumers using their credit cards or other payment systems. At block 602 a consumer's coupon database 102 is established. This database 102 can be set up in a number of ways, such as by pre-enrolling a consumer using credit card, email, and other consumer information provided by the list owner. Multiple consumers may be pre-enrolled at one time by using the information provided by the list owner. Alternatively, the consumer can subscribe directly, and in some instances this may occur before a coupon offer has been sent to the consumer (such as described with respect to block 606)). The coupon database may have consumer profile information associated with it, including information about the consumer's coupon preferences, such that targeted coupon offers can be sent to the particular consumer.

In accordance with embodiments described in this application, at block 604 the consumer's coupon database 102 is associated with one of the consumer's credit cards or other payment system. This association may be at the marketer site 104 (which may store the actual consumer credit card number or an encoded version thereof), it may be at the credit card computer site 130 (which may store the consumer account number that is associated with the consumer at the marketer 104), or the association may be through a card-matching agent 830. The card-matching agent 830 (see FIGS. 8-10) may be physically separate from both the marketer site 104 and the credit card computer site 130, or, in those systems using the agent 830, it may be provided by a logically separate but physically co-located item at one of those sites. The card-matching agent 830 provides the advantage that the marketer 104 can send out coupon offers and process coupon redemptions without having to be provided actual consumer credit card information. Accordingly, the matching agent 830 can provide enhanced security for the coupon transactions.

Still referring to FIG. 6, at block 606 coupon offers are delivered and presented to consumers 103. The means of presentment may be through mass emails using a list owned by the marketer 104 or a list that is leased from a list owner 810. The list can be sent from the marketer 104 or the list owner 810. The offer can also be made to cell phone, cable, or interactive television subscribers through messages sent to them, in which case their service providers for their respective services may act as the list owners 810, as they would have the consumer's electronic contact address and credit card or other payment system information. As other alternatives to mass emailing, the coupon offers can be presented and delivered to consumers 103 through web banner ads, possibly based on the consumers 103 already having an account with the marketer 104, or also possibly without the consumers 103 having such accounts. No matter the approach used above, it may be desirable to provide for the sending of coupon offers to consumers not registered with the marketer 104, allowing the consumers to register when they electronically accept the coupon for storage in their coupon database 102.

Still referring to FIG. 6, and in a more specific embodiment method is described here such as might be employed with the system illustrated in the systems of FIGS. 8-10 (discussed below). For this embodiment, the marketer 104 creates details of an offer for the merchant/advertiser 120/820. Within block 606, the marketer 104 sends the coupon offer to a matching agent 830. The list owner also sends a list 810 of associated email addresses 812 and credit card numbers 814 to the matching agent 830. The matching agent 830 can, at this stage or in block 604, mass enroll the list with the marketer 104, depending on business models and whether the list owner has permission to mass enroll the list 810 under the prescribed conditions with its list members. Whether or not the list 810 has been mass enrolled, the marketer 104 can then send to the list owner an "enabled offer," that may be characterized, for instance, by having embedded identification/validation numbers that will associate a particular offer with a particular consumer. The validation numbers or other consumer identifier provides a measure of security against fraud or coupon misuse. The list owner 810 in turn presents the enabled offers to the consumers 103, who may receive the offers at their PCs 110, interactive TVs 109a, PDAs 109b, or cell phones 109c (see FIG. 10). No matter the sources for the validation numbers, consumer identifiers, or enabled offers, the coupon offers can be presented to the consumers 103 by a number of different sources and through a number of different media.

At block 608, and still referring to FIG. 6, coupons that have been selected or accepted by a consumer are stored in the consumer's coupon database 102. This storage can be as a result of the consumer clicking an "I accept" target on received email or on a banner ad or other coupon offer presented to the consumer, or the storage can be the result of an automatic process by which coupons are automatically placed in the consumer's coupon database 102 in accordance with the consumer's stored coupon preferences.

As shown in block 610, the coupons that were stored in the consumer's coupon database at block 608 can be redeemed by using the consumer's credit card that is associated with the consumer's coupon database 102. The credit card may be used at a "brick and mortar" or on-line merchant 120. Upon use of the credit card, the merchant 120 will send an Authorization Request ("AR") to the credit card company server 132 through security interface units 125. In such a transaction, typically the entity logically referred to here as the credit card company server 132 is comprised of a credit clearing bank or acquiring bank computer system that communicates with the merchant 120, a credit card issuing computer system that manages the cardholder/consumer accounts, and a credit card association server that is associated with the particular credit card association, such as Visa® or MasterCard®. These various servers all communicate in order to clear the ARs and reconcile the cardholders' credit card statements. Once the AR has been cleared, the credit card company server 132, which as discussed above comprises the servers of one or more entities, will send an Approval Code ("AC") back to the merchant 120 for the requested transaction. This transaction will also trigger the redemption of qualifying purchases for which the consumer 103 has a stored credit card offer, although there are be a number of possible methods by which this redemption can be accomplished.

Still referring to the redemption block 610 of FIG. 6, the redemption of the coupon can be applied at the merchant POS terminal 122, it can be applied to the consumer's credit card statement by the credit card mainframe 132, or it can be paid by a separate check or credit be sent to the consumer 103. Using any method, the credit card server 132 will communicate with the credit card interface server 108 at the marketer 104 to determine for a particular cardholder/consumer whether a particular purchase included products for which the consumer had accepted and stored a coupon offer in the consumer's coupon database 102. Normally, the AR/AC communications sent between a merchant 120 and a credit card company server 132 do not include specific transaction data about what particular items have been purchased. These communications typically comprise just top-level transactional data such as the amount purchased and the cardholder identity. Should actual coupon clearing at the merchant POS 120 be desired, however, it would be possible to embed specific transactional data in the AR and particular redemption data in the AC, such that the coupon discount can be applied at the POS. It is also possible to communicate over a separate, parallel communications channel, such as the Internet or an intranet, or a Virtual Private Network ("VPN") to separately request and apply a coupon discount between the merchant POS and the credit card server 132 or a database server (such as credit card interface server 108 or virtual document server 106 or another server) for the consumer database 102. It is still further possible to communicate, as described above or using other means, the transaction details including items purchased in order to separately reconcile qualifying purchases and to apply the coupon discount to the consumer's credit card statement or otherwise provide a separate credit or payment to the consumer for the redeemed coupons.

Figure 7:
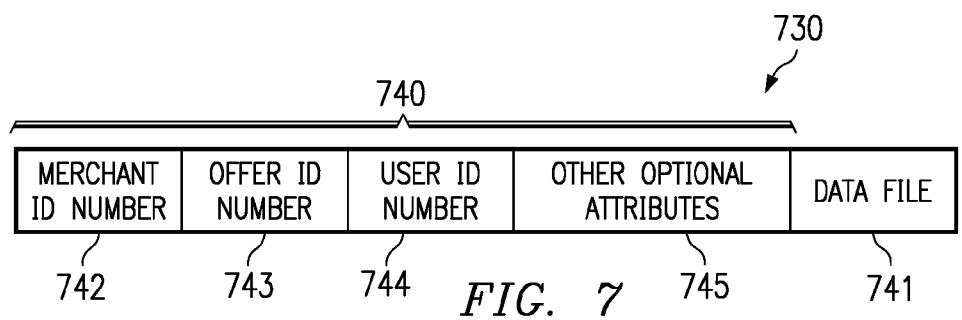
FIG. 7 illustrates a data structure of an exemplary promotional offer.

Referring now to FIG. 7, an attribute file is associated with a coupon offer to facilitate the filtering and storage of the virtual coupon offers in the consumers' coupon databases. FIG. 7 illustrates a data structure 730 describing an example of how attribute information 740 can be set up and associated with a virtual coupon offer information 741. Information contained within the attribute file 740, which is associated with the VRCD data file 741, might include a merchant ID 742, offer or promotion ID 743, user ID 744, or other attributes 745. Other attributes might include merchant class, website URL, merchant address, map, and email information.

Figure 8:
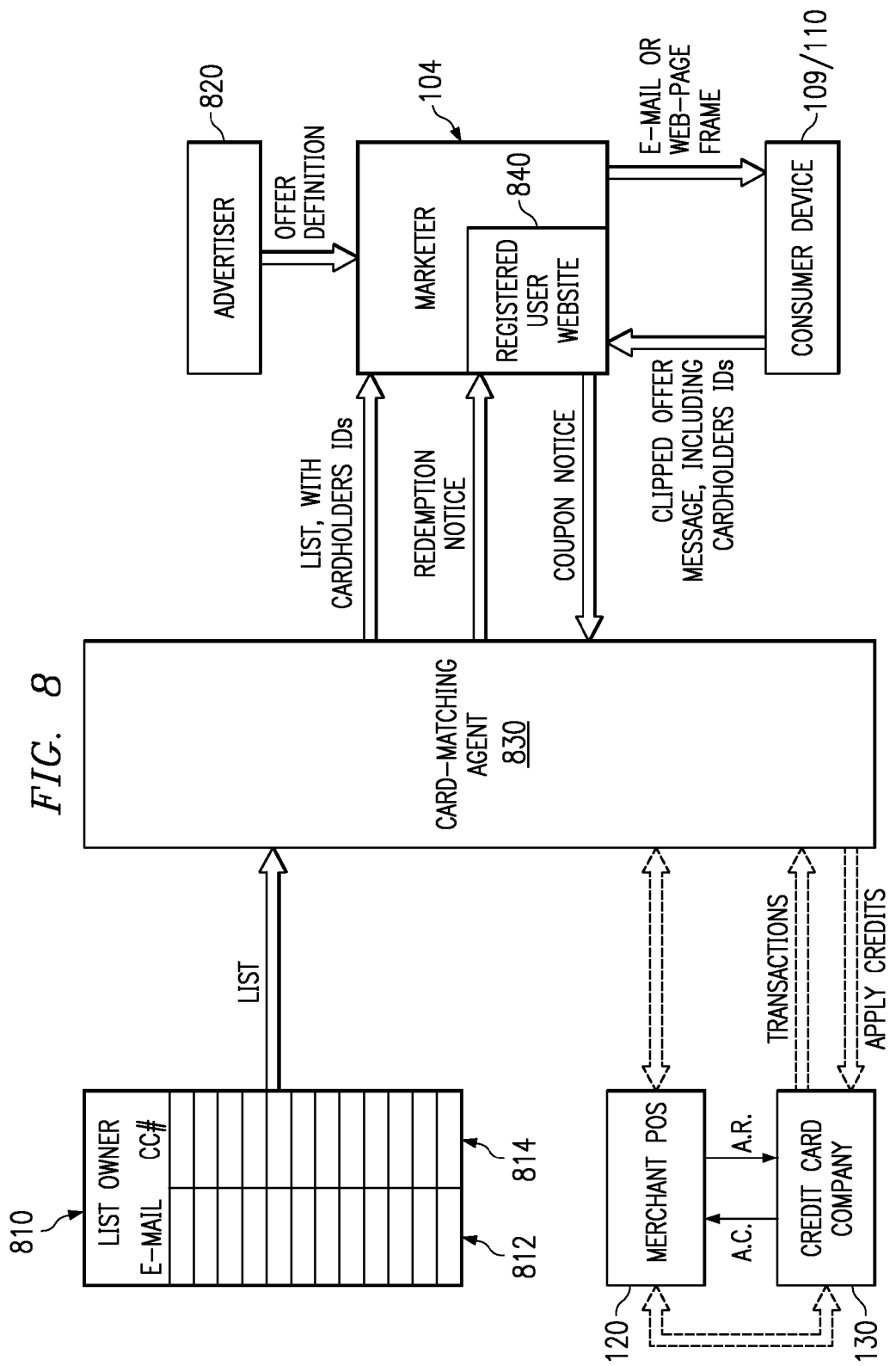
FIG. 8 provides an exemplary block diagram of a promotional offer distribution, organization, and redemption system.

FIG. 8 provides a block diagram for a system for the redemption of coupon offers stored on a consumer's credit card. There are many different ways in which such a system can be configured, and the system of FIG. 8 provides one such system. Common to the embodiments disclosed in this application are an advertiser 820, which may be synonymous with the merchant 120 or may be a separate entity with a direct or indirect business relationship with the merchant 120. The advertiser 820 provides to a marketing entity 104 a definition of an offer that it wishes to be made to a certain group. The marketer 104 may have its own list for distribution or it may receive a list from a list owner 810. In this embodiment, the consumers 103 are associated with credit cardholder accounts. In this example, for instance, the list owner 810 may have a list of email addresses 812 and credit card numbers 814 for each consumer 103.

In the embodiment of FIG. 8, the actual credit card numbers are not provided to the marketer 104, but instead are passed through a card-matching agent 830, which may be an entity that is separate from the credit card company 130 or it may be a separate function provided by the credit card company 130. The card-matching agent 830 provides the list 810 in this embodiment with encoded credit card numbers or consumer identifiers, which the card-matching agent 830 can later use to identify redeemed offers.

Still referring to the embodiment of FIG. 8, once the marketer 104 has received the list of consumers 103 and has received a defined offer from the advertiser 820, the marketer 104 can provide these offers to the list 810 of consumers via email or through other delivery means such as a web-based banner ad, interactive television ad, wireless Personal Digital Assistant ("PDA") offer, cell phone offer, or through other means. The consumer 103 can then accept the coupon offer by clicking on a clickable button or other means provided in the offer. Upon accepting the offer, a message is sent from the consumer back to the marketer 104 and the offer can be saved at the consumer's registered user website 840. The hardware at the marketer site 104 can be implemented in number of ways. For example, a virtual document server 106 as shown in FIG. 1 can be provided at the marketer site in order to email or otherwise deliver the coupon offers to the consumer. This virtual document server 106 may also be configured to receive the accepted coupon offers from the consumer devices 109, 110, store those accepted offers in the consumer database 102, and reflect the consumer's accepted coupon offers at the registered user website 840. In those instances where the consumer is not already registered for a website 840 and/or a consumer database 102 with the marketer 104, the consumer can be directed to register with the marketer 104 such as by the method shown in FIG. 3.

Referring further to FIG. 8, once the accepted coupon offers are stored in the consumer database 102 (see FIG. 1), the marketer site 104 is preferably synchronized with the credit card company 130 either directly or through the card-matching agent 830. There are a number of different ways to configure the synchronization process between the marketer 104 and the credit card company 130. In the embodiment of FIG. 8, for instance, once a coupon offer has been accepted and stored at the registered user website 840 and coupon database 102, a "coupon notice" is sent to the card-matching agent 830, which may thereupon be prepared to redeem that accepted coupon offer when the consumer/cardholder uses his credit card to make a qualified purchase at the merchant 120. Thus, when the consumer 103 makes his purchase at the merchant 120, the POS terminals 122 may send an AR to the credit card company 130. This transaction may immediately or later be cleared through the card-matching agent 830 to determine whether a qualified purchase using an accepted coupon offer has been made. If so, the card-matching agent 830 will apply a credit either to the consumer's credit card statement according to the credit card mainframe server 132, or this credit may be transmitted back to the merchant 120 through its POS terminal 122 so that the discount can be applied directly at the Point-Of-Sale ("POS") terminal 122.

When checking specific transaction data against the consumer's coupon database 102, the POS 120 may communicate through the credit card site 130, or, as shown by the double dashed lines connecting the two sites 120,830, it may communicate directly with the matching agent 830. The POS 120 may also communicate in either instance directly with the marketer 104. Thus, the coupon database 102 may be located at either the marketer site 104 or the matching agent site 830, or may be at another location. The transaction data from the POS can be compared to the stored accepted promotional offers in the coupon database 102, and that transaction data may be fed directly from the POS site 120 to the location of the coupon database 102 or it may go indirectly, through another site such as the matching agent 830. When an accepted promotion offer is found in the coupon database 102, a "redemption notice" may be sent to the card-matching agent from the site, such as marketer 104, that is hosting the coupon database 102. In those instances where the card-matching agent 830 maintains the coupon database 102 and receives the transaction data from the POS 120, however, the "coupon notice" and "redemption notice" between the two sites may not be used. In some embodiments, on the other hand, parallel databases may exist at the marketer site 104 and the card-matching agent site 830. In such instances, there still may be a synchronization process between the two databases, even if no explicit "redemption notice" or "coupon notice" is sent between them.

Figure 9:
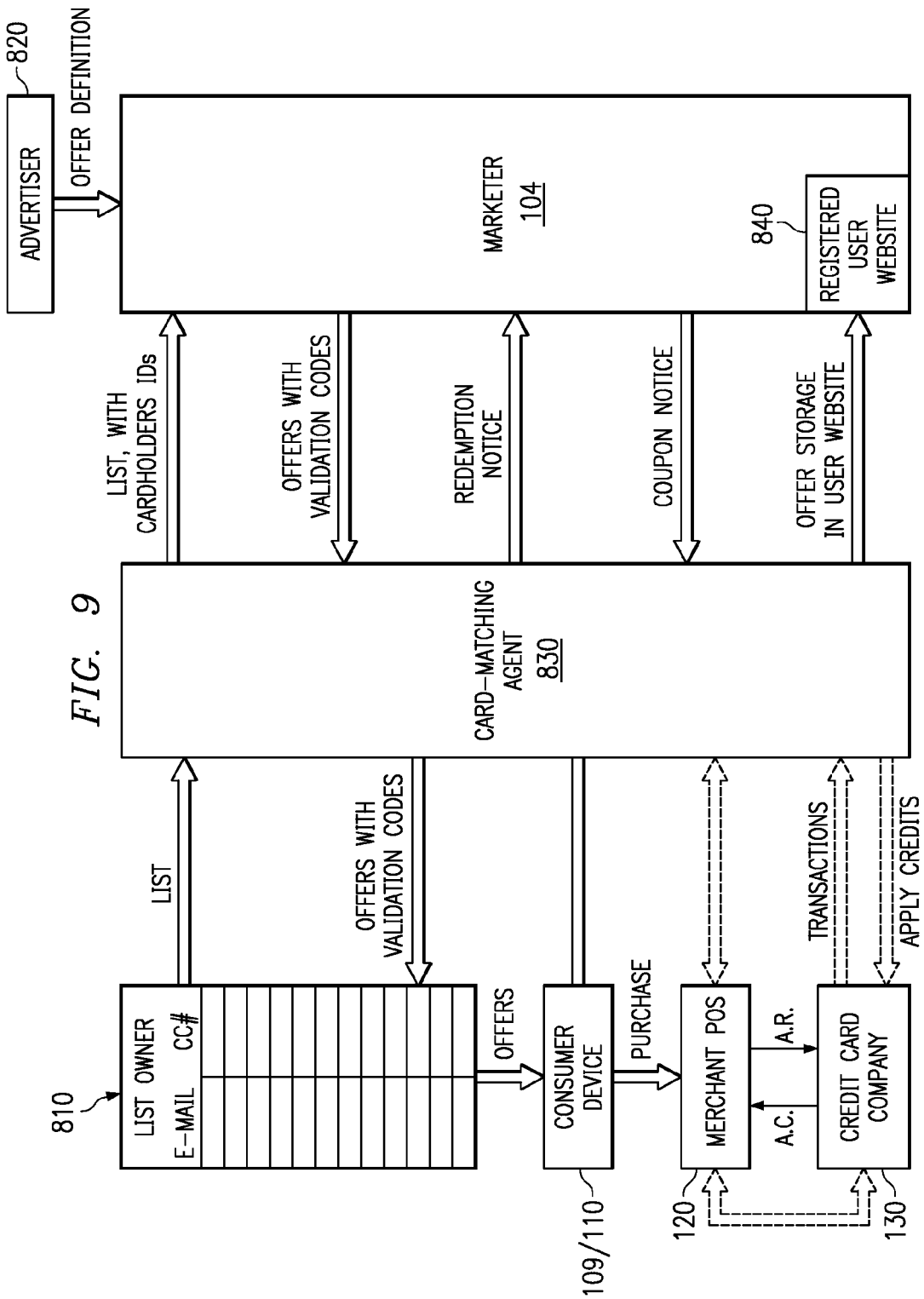
FIG. 9 provides an exemplary block diagram of another embodiment of a promotional offer distribution, organization, and redemption system.

FIG. 9 provides a block diagram or network diagram for a coupon redemption system that is configured differently from the coupon redemption system of FIG. 8. In the embodiment of FIG. 9, instead of the marketer 104 sending out the coupon offers to the consumers 103, the list owner 810 performs this function. To enable the list owner 810 to send out these coupon offers and to synchronize these offers with the consumer credit cards and credit card companies 130 and with the particular offers, the list owner 810 provides its list to the card-matching agent 830, as was done in FIG. 8. The card-matching agent 830 again provides this list with the encoded credit card numbers or consumer identifiers to the marketer 104, which then associates the list with offers and validation codes. The updated list, associated with promotional offers and validation codes, is provided back to the card-matching agent 830, which then passes this information on to the list owner 810. The list owner 810 delivers the promotional offers to the consumers 109 using one of the methods described with respect to the embodiment of FIG. 8 or another method.

As before with respect to FIG. 8, the consumer 103 can accept the offers made to him or her, and in this instance that acceptance would cause a notification to be sent to the registered user website 840 and coupon database 102 in order to store the offer in the user website 840. As with the embodiment of FIG. 8, the marketer 104 could then send a coupon notice to the card-matching agent 830, which could remain in communication with the credit card company 130 to insure that the coupon offer discount is applied to either the consumer's purchase at the merchant POS 120 or is applied to the consumer's credit card statement.

Figure 10:
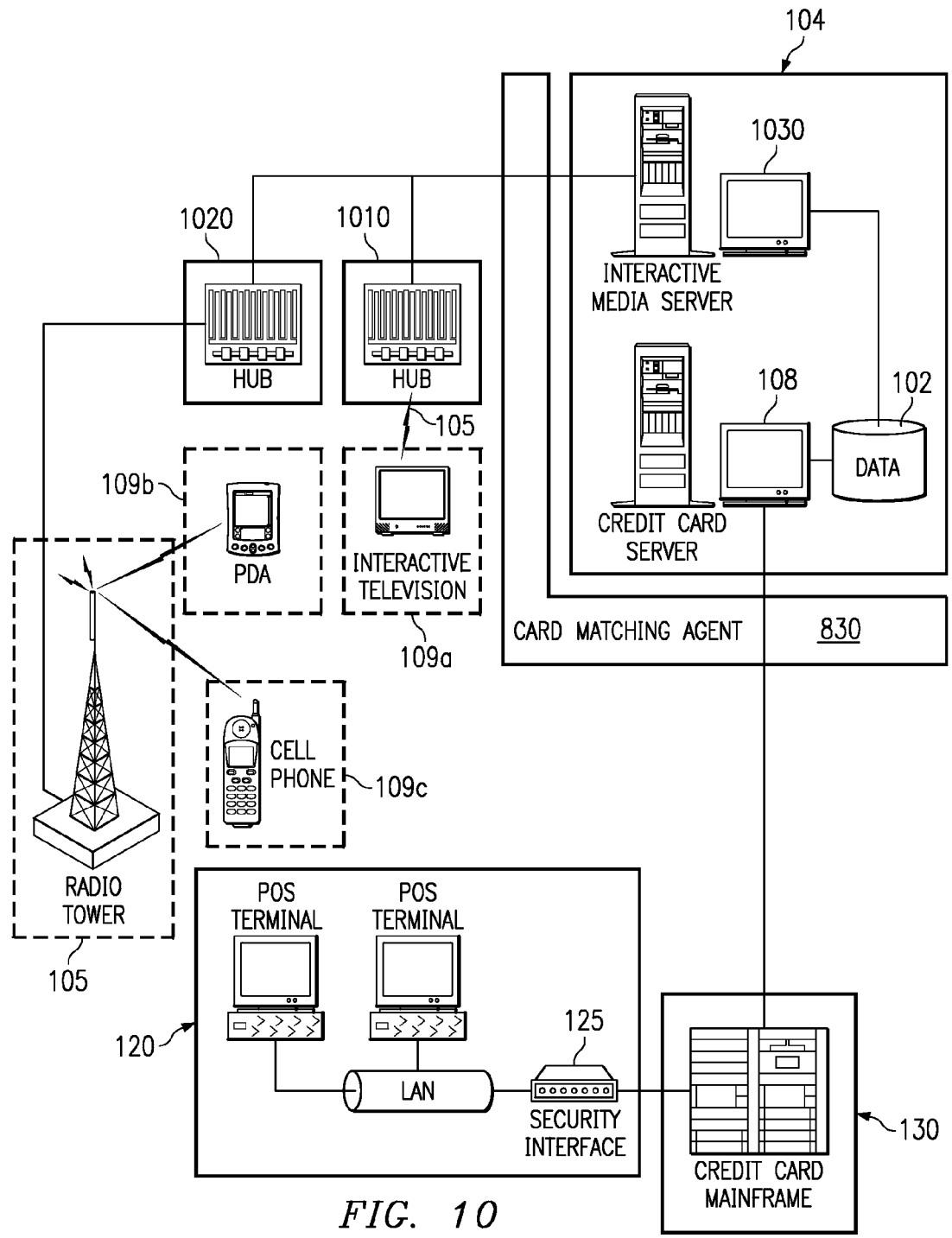
FIG. 10 provides still another exemplary block diagram of an embodiment of a promotional offer distribution, organization, and redemption system.

FIG. 10 illustrates and emphasizes that the systems and methods described above can be used in networks other than Internet and/or traditional email delivery networks 105. For example, as shown here coupon offers can be delivered to consumers through interactive television networks, represented in FIG. 10 by network hub 1010 and consumer device 109*a* or to PDAs or cell phones as shown by hub 1020 and consumer devices 109*b-c*. The form of these coupon offers may be similar to those illustrated in FIGS. 2-3, and user interfaces at the marketer 104 could be provided similar to those shown in FIG. 4. Confirmations can be made similar to the ones shown in FIG. 5. The user interfaces, however, need not be limited to the approaches shown in these preceding figures. For example, with current cell-phone technology and/or PDA technology, the displays provided on these devices are typically smaller than would be provided in a computer terminal or interactive television set, and accordingly reduced screens can be used. In some instances, the consumer communication devices may not have display screens at all, and it would be possible to configure these offers to be made and accepted by means other than visual displays. For example, voice response systems could be used to make and receive the coupon offers to and from the consumers. Such acceptance by key presses and/or vocalization can be applied to both cell-phone-based and land-based phone offers.

When employing the systems of the type shown in FIG. 10, because of the proprietary nature of the networks through which these offers are made and received, the coupon offers would typically be both made and received through an interactive media server 1030 acting through the hubs 1010, 1020 of the proprietary networks. As before, a card-matching agent 830 can be provided to translate credit card numbers to and from consumer identification numbers or to otherwise encode or disguise the credit card numbers from the marketer 104. The interactive media server 1030 may also in this embodiment provide the web interface 840 whereby consumers can manage their virtual coupons that have been accepted and stored in their coupon databases 102.

By accepting the coupon offers through their proprietary networks via the hubs 1010, 1020, these accepted coupon offers are stored in the consumers' databases 102, whereupon the credit card interface server 108 can synchronize the accepted coupon offers with the consumers' credit card accounts with the credit card company 130. The card-matching agent 830 again can provide the translation between credit card numbers and consumer identifiers or equipped credit card numbers through which the consumers are known to the marketer 104.

Upon redemption of the coupon offer by the consumer 109 by the use of his associated credit card at the merchant 120, the merchant 120 sends the transaction data to the credit card company 130 and/or the matching agent 830. The matching agent 830, the credit card company 130, or the credit card company through the matching agent 830 or directly through the marketer 104, depending on how the system is set up, then matches the transaction data to the consumer's credit card, whereupon the discount is either applied directly at the merchant 120 or to the consumer's credit card statement.

Although the various methods described herein have been described for implementation in a general purpose computer selectively activated or reconfigured by software, one of ordinary skill in the art would also recognize that such methods may be carried out in hardware, in firmware, or in more specialized apparatuses constructed to perform the methods. Further, as used herein, a "client" should be broadly construed to mean any computer or component thereof directly or indirectly connected or connectable in any known or later-developed manner to a computer network, such as the Internet. A "client" should also be broadly construed to mean one who requests or gets the file, and the "server" is the entity that downloads the file.

References to credit cards in the specific embodiments above should be understood to refer broadly to other payments systems and methods such as debit cards, electronic payment systems, automated billing systems, or other payment systems, including other billing systems described in this application. "Coupons," "coupon offers," and "promotional offers" should be broadly construed to include tickets, vouchers purchased for value, and other items that are redeemable or otherwise have value, such as frequent flyer miles or other "points" or "credits" that may be redeemable for reward goods and/or services.

In all the above-described embodiments, the actual locations of the coupon databases and the nature of the communications between different sites may be adapted depending on system design considerations. For example, depending on the relative locations of the coupon databases and the sites receiving transaction data from the POSs, it may not be necessary to have redemption notices and coupon notices sent. Further, depending on where offers are "built" from lists of electronic contact addressers and advertiser information, it may not be necessary in some instances to send lists and offers with validation codes and/or cardholder ID numbers among the list owner, card matching agent, and marketer. Registered user websites may be provided for consumers to maintain their coupon databases, but it not necessary to provide such websites. When provided, the websites could be hosted by the marketer, card matching agent, list owner, or other entity. The registered user website may be an interface to the coupon database or to another database that may be synchronized with the coupon database.

Applicant intends that the claims shall not invoke the application of 35 U.S.C §112, 6 unless the claim is explicitly written in means-plus-step or means-plus-function format.

The invention claimed is:

1. A method of managing virtual documents on behalf of a plurality of members, wherein each virtual document comprises data associating it with one of the members, the method comprising:

establishing a member database on a network-connected computer within a member computer network, said member database having data records corresponding to each of a plurality of members, each of the plurality of members having one or more network-connectable computing devices, wherein the one or more network-connectable computing devices and the member database comprise the member computer network;

receiving virtual documents at the member database from one or more document sources external to the member computer network;

extracting the data from the received virtual documents associating each received virtual document with a corresponding member of the plurality of members;

storing received virtual documents associated with corresponding members in the data records corresponding to the plurality of members; and synchronizing, using the member computer network, a stored virtual document to a mobile device of a member corresponding to said stored virtual document, wherein at least one of said virtual documents comprises an incentive offer and the one or more document source is an offer distributor.

2. A method according to claim 1, wherein said virtual documents each comprise an attribute file identifying a classification for each virtual document, the method further comprising:

extracting said attribute file from each virtual document; and classifying each virtual document within data fields in the data records associated with corresponding members.

3. A method according to claim 1, wherein said at least one virtual document further comprises data identifying the incentive offer, data identifying a distributor of the incentive offer, and data identifying a business advertiser honoring the incentive offer.

4. A method according to claim 3, the method further comprising storing within data fields in the data records associated with corresponding members, the data identifying the incentive offer, data identifying a distributor of the incentive offer, and data identifying a business advertiser honoring the incentive offer.

5. A method according to claim 1, wherein the virtual documents comprise e-tickets and the one or more document sources is an e-ticket seller.

6. A method according to claim 1, wherein said synchronizing comprises synchronizing in response to a request received from the member corresponding to said synchronized virtual document.

7. A method according to claim 1, wherein the synchronizing comprises synchronizing using an application running on the mobile device.

8. A method according to claim 1, wherein the synchronizing comprises synchronizing based on a geographic location of the mobile device.

9. A method according to claim 1, wherein the member computer network comprises a registered member computer network for registered members.

10. A method of managing virtual documents on behalf of a plurality of members, the method comprising:

establishing a member database on a network-connected computer within a member computer network, said member database having data records corresponding to each of a plurality of members, each of the plurality of members having one or more network-connectable mobile devices, wherein the one or more network-connectable mobile devices and the member database comprise the member computer network;

extracting, using one or more computing devices associated with the member computer network, from each of a plurality of virtual documents transmitted from one or more document sources external to the member computer network, data associating each transmitted virtual document with a corresponding member of the plurality of members; and causing, using one or more computing devices associated with the member computer network, at least part of a transmitted virtual document to be provided to a mobile device of a member corresponding to said virtual document in response to a request for said virtual document received from the mobile device of the corresponding member, wherein at least one of said virtual documents comprises an incentive offer and the one or more document source is an offer distributor.

11. A method according to claim 10, wherein said virtual documents each comprise an attribute file identifying a classification for each virtual document, the method further comprising:

extracting said attribute file from each virtual document; and classifying each virtual document within data fields in the data records associated with corresponding members.

12. A method according to claim 10, wherein said at least one virtual document further comprises data identifying the incentive offer, data identifying a distributor of the incentive offer, and data identifying a business advertiser honoring the incentive offer.

13. A method according to claim 10, wherein the virtual documents comprise e-tickets and the one or more document sources is an e-ticket seller.

14. A method according to claim 10, wherein the request from the mobile device of the member is based on geographic location data related to a geographic location of the mobile device of the member corresponding to said virtual document.

15. A method according to claim 10, wherein the member computer network comprises a registered member computer network for registered members.

16. A method according to claim 10, wherein causing at least part of a virtual document to be provided to a mobile device comprises causing at least part of the virtual document to be transmitted to the mobile device directly from the document source of the virtual document rather than from the member network.

17. A method according to claim 10, further comprising storing the plurality of virtual documents transmitted from the one or more document sources in data fields in the data records associated with corresponding plurality of members.

18. A method according to claim 17, wherein causing at least part of a virtual document to be provided to a mobile device comprises causing at least part of the virtual document to be transmitted to the mobile device of the requesting member from the member database.

\* \* \* \* \*